Patented Aug. 26, 1952

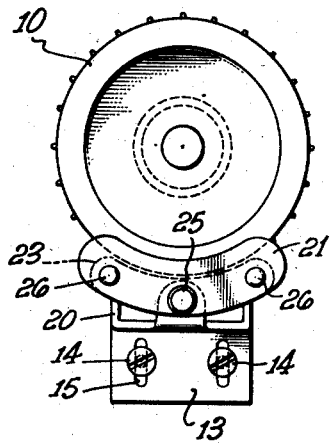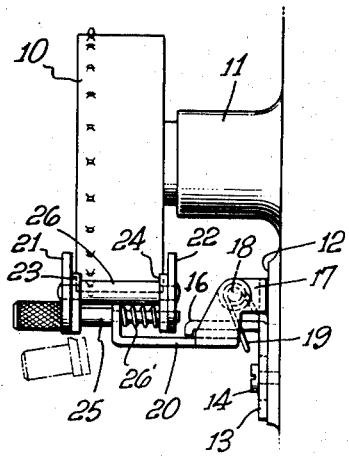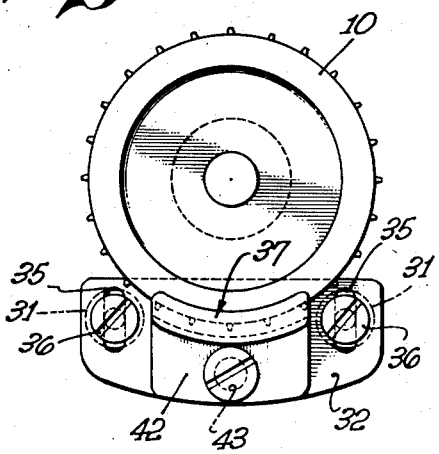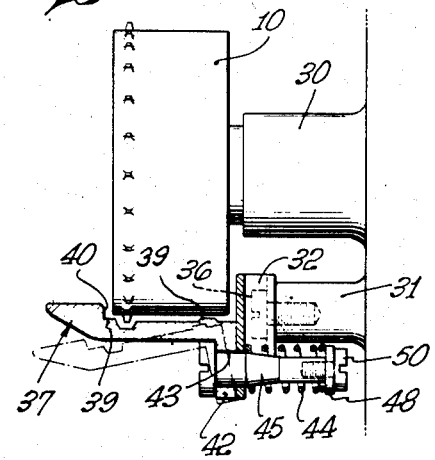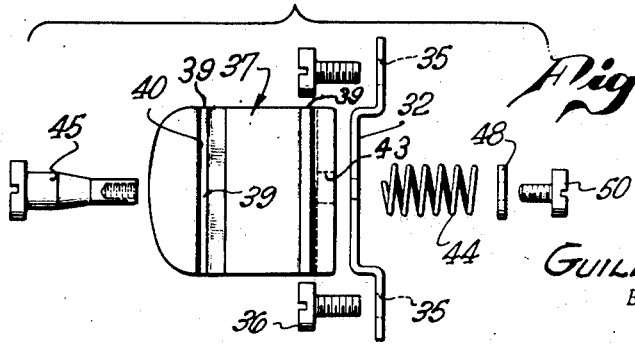

2,608,406

UNITED STATES PATENT OFFICE 2,608,406

SPROCKET SHOE

Guillermo A. del Valle, Indianapolis, Ind., assignor to Radio Corporation of America, a corporation of Delaware Application March 7, 1945, Serial No. 581,384

7 Claims. (Cl. 271—213)

This invention is a continuation in part of my application, Ser. No. 423,863, filed December 20, 1941 (now abandoned), relating to motion picture apparatus and particularly to a shoe or skid for guiding sound motion picture film to and from a sprocket or roller.

The use of toothed sprockets for advancing motion picture film through cameras, projectors, sound recorders, and reproducers, is well-known, the film being generally maintained on said sprockets by the use of pad rollers, such as shown in Ross et al., Patent No. 2,073,225 of March 9, 1937. Pad rollers and film shoes may serve as edge guiding elements so as to maintain the film in a predetermined lateral position with respect to a sprocket or roller, and this is particularly true of 16 mm. film, which has only one row of sprocket holes. In 16 mm. film apparatus, however, the entire units are usually compact, and it is particularly desirable that the operating elements be small and efficient. Although pad rollers have been used with success in large cameras and projectors for 35 mm. film, it has been found that a film shoe has many advantages over pad rollers for small equipment using the narrower widths of film, especially when the small film has a sound track thereon.

One of the advantages of the present film shoe over a pad roller which necessarily has rollers of small diameter for narrow film, is that the rollers do not rotate freely because of the clearance needed between the rollers and sprocket to accommodate the double thickness of the film when splices pass between the sprocket and pad rollers. This lack of rotation causes the rollers to gum up and become sticky and thereby not rotate even when the film does come into contact with the roller. If a roller remains stationary for some time, a flat spot develops or wears on the periphery of the roller which renders the roller inoperative as far as its function as a pad roller is concerned. Furthermore, a roller offers support to the film only at the point of contact which theoretically is only along one line, while a shoe or skid supports the film against the sprockets along its entire length. The shoe of the present invention also permits film to be threaded on a sprocket during the rotation of the sprocket which cannot be accomplished with the usual pad rollers.

The present invention, therefore, is directed to a film shoe or skid which not only guides the edges of film and maintains it on sprockets and rollers, but which requires less space than a pad roller construction performing the same function. It also permits the threading of the film during the running of the machine, which, although not the usual procedure, is sometimes desirable in cases of the multiple operation of a group of projectors.

The principal object of the invention, therefore, is to facilitate the guiding and maintaining of a film on a film drive sprocket.

Another object of the invention is to provide an improved film guide shoe.

A further object of the invention is to provide an improved flexible mounting for a film guide shoe.

A further object of the invention is to provide an improved mounting for a film guide shoe which will permit the operation thereof during the rotation of the sprocket.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 1 is a front view of one modification of a film shoe assembly embodying the invention.

Fig. 2 is a side elevational view of the modification shown in Fig. 1.

Fig. 3 is a front view of another modification of a film shoe assembly embodying the invention.

Fig. 4 is an elevational section of the modification shown in Fig. 3, and

Fig. 5 is an exploded view of the elements comprising the film shoe assembly of the modification shown in Figs. 3 and 4.

The sprocket indicated at 10 is shown as mounted on a shaft passing through the projecting boss 11 of a sound picture apparatus, this boss being formed on a portion of the device which is also provided with a flat surface member 12. The film shoe bracket 13 fits against the member 12 where it is secured by the screws 14 passing through the slots 15 which permit adjustment of the shoe toward or away from the sprocket. The film shoe supporting arm 20 is pivoted on the bracket 13 by means of a shaft 18 and is urged against the stop 16 by an appropriate spring 19. The shaft 18 passes through appropriate ears 17 turned up from the member 13.

The film shoe itself is composed of the side guide members 21 and 22 and pressure members 23 and 24 which are held together by the shouldered rivets 26. The shoe is mounted on a shaft member 25 which passes through a hole in the bracket 20 and is rotatable therein. The shaft member 25 has an outer knurled portion which serves as a handle for opening the shoe for threading, and an inner reduced portion which passes through the hole in the member 20 and carries the spring 26 positioned between the upturned end of member 20 and the inner surface of pressure member 24, thus holding the end of member 20 against the shoulder formed on the shaft member 25. The shaft 25 passes through appropriate holes in side and pressure members 21, 22, 23, and 24, the end opposite the handle being suitably fastened.

The shoe can be opened for threading the film by pressing the knurled member downwardly to the position shown in the dotted lines, and when the shoe is released, the spring 19 returns it to position against the stop 16.

Since the shoe is rotatable with the shaft 25, any lump or splice in the film striking one side of the shoe will merely cause it to rotate about this shaft and the pressure at both ends of the shoe will be equalized.

The shoe is adjusted in the same manner as is customary with the pad rollers so that it does not normally run in contact with film lying snugly against the sprocket 10, but contacts only with a double thickness of film such as occurs at a splice. With this amount of clearance, the shoe is sufficiently close to the sprocket to prevent the film from leaving the sprocket teeth.

Referring now to Figs. 3, 4, and 5, the sprocket 10 is mounted on a shaft passing through the projecting boss 30, while two similar but smaller bosses 31 support the ends of a U-shaped bracket 32. As shown in Fig. 3, the bracket 32 has elongated holes 35 therein through which screws 36 pass, the screws being threaded in the bosses 31 to maintain the bracket 32 in any adjusted position within the length of the holes 35. The shoe 37 has a curvature to correspond to the curvature of the sprocket 10, has pressure shoulders 39, and an edge guiding shoulder 40.

In a rear extending flange 42 of the shoe 37 is a hole 43 through which a stud 45 passes, said stud also passing through a hole in bracket 32, through a coil spring 44, and through a hole in a washer 48. A screw 50 is threaded into the end of the stud 45 to maintain the stud, shoe, spring, and washer 48 in assembly on the bracket 32. This unit is then mounted in position with respect to the sprocket 10 by means of the screws 36 threaded into the bosses 31. Thus, the shoe 37 may be positioned at the proper distance from the sprocket 10 by adjusting the bracket 32 as described above with respect to the first modification, the shoe being tiltable on the stud 45 to accommodate the passage of splices with the minimum of strain on the film.

To permit the threading of the film on the sprocket, the extending tip of shoe 37 is simply pressed downwardly, as shown by the dotted lines in Fig. 4. This may be accomplished inasmuch as the stud 45 has a tapered portion which is pulled forward against the tension of the spring 44 into the hole in the bracket 32 to permit the flange 42 to be tilted on the stud. When the pressure on the end of the shoe is removed, the tension of the spring 44 immediately restores the shoe to its operative position.

Ordinarily, the shoe is depressed with one hand and the film threaded on the sprocket with the other hand. Another threading operation, however, consists in holding the film with two hands and the portion of the film between the hands is brought to bear on the tip of the shoe. The shoe is thus depressed, and the film slid under the sprocket and then released. The tension of the spring 44 will raise the shoe and the film so that the teeth of the sprocket will engage the perforations. In this manner, the film may be threaded very quickly at any time and even permits threading during the rotation of the sprocket. With two or three sprockets on a machine, an operator may thread the film on the first sprocket and then as the film is advanced it is threaded on the other sprockets so that the entire threading operation may be accomplished without stopping the machine. In case the loops between the sprockets are not of proper size, it is only necessary to grasp the film on both sides of the sprocket, depress the shoe, and move the film backward or forward to adjust the loops to the proper length. It will be noted that this operation cannot be accomplished with the usual type of pad rollers. The above film shoes, therefore, provide simple, small film guide mechanisms, particularly applicable to narrow film advancing apparatus.

I claim as my invention:

1. A film shoe assembly adapted to maintain a film in contact with a sprocket comprising in combination, a film shoe having a concave film contacting portion which has a curvature concentric with the film engaging surface of said sprocket, said shoe extending beyond the face of said sprocket and having a flange portion, a shaft carried by said flange, said flange and said shaft and said shoe forming a unitary structure, the axis of said shaft being parallel to the axis of said sprocket, a bracket mounted adjacent said sprocket, said shaft being loosely mounted on said bracket whereby said shoe may be rotated with respect to said bracket about the axis of said shaft and may also be moved axially with respect thereto, and means for axially positioning said shoe with respect to said bracket, said positioning means including a spring abutment surface on said bracket and a cooperating spring abutment surface on said unitary structure, and a resilient device mounted coaxially under compression about said shaft between said abutment surfaces.

2. A film shoe assembly according to claim 1 wherein the abutment surface on said unitary structure is formed on said shaft.

3. A film shoe assembly according to claim 1 wherein the abutment surface on said unitary structure is formed on said bracket.

4. A film shoe assembly according to claim 1 wherein said shaft includes a tapered portion.

5. A film shoe assembly according to claim 1 wherein said positioning means includes a spring to tilt said shoe toward the surface of said sprocket.

6. A film shoe assembly adapted to maintain a film in contact with a sprocket comprising, in combination, a bracket, a film shoe mounted on and abutting the said bracket, the said shoe being provided with a shaft projecting laterally therefrom through an opening in said bracket, the said opening being larger in diameter than the diameter of said shaft whereby said shoe may be moved axially and rotated and tilted with respect to said bracket about the axis of said shaft, and a resilient device operatively associated with said shoe and bracket for axially positioning said shoe with respect to said bracket.

7. A film shoe assembly adapted to maintain a film in contact with a sprocket comprising, in combination, a film shoe having a concave film contacting portion which has a curvature concentric with the film engaging surface of a sprocket, said shoe being of a width to extend beyond the face of the sprocket and having a second portion spaced from said concave portion, a shaft carried by said second portion, said shaft and said shoe forming a unitary structure, the axis of said shaft being parallel to the axis of said sprocket, a bracket mounted adjacent said sprocket, said shaft being loosely mounted on said bracket whereby said shoe may be rotated with respect to said bracket about the axis of said shaft and may also be moved axially with respect thereto, and means for axially positioning said shoe with respect to said bracket, said positioning means including an abutment surface on said bracket and a cooperating abutment surface on said unitary structure, and a resilient device mounted coaxially under compression about said shaft between said abutment surfaces.

GUILLERMO A. DEL VALLE.

REFERENCES CITED

The following references are of record in the file of this patent:

UNITED STATES PATENTS

| Number    | Name    | Date          |
|-----------|---------|---------------|
| 1,882,014 | Howell  | Oct. 11, 1932 |
| 2,228,092 | Sperry  | Jan. 7, 1941  |
| 2,422,310 | Nemeth  | June 17, 1947 |